US012482553B2

(12) United States Patent
Tahmasebi Maraghoosh et al.

(10) Patent No.: US 12,482,553 B2
(45) Date of Patent: Nov. 25, 2025

(54) SYSTEM AND METHOD TO AUTOMATICALLY PREPARE AN ATTENTION LIST FOR IMPROVING RADIOLOGY WORKFLOW (71) Applicant: KONINKLIJKE PHILIPS N.V., Eindhoven (NL)

(72) Inventors: Amir Mohammad Tahmasebi Maraghoosh, Arlington, MA (US); Merlijn Sevenster, Haarlem (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 98 days.

(21) Appl. No.: 16/753,477

(22) PCT Filed: Sep. 25, 2018

(86) PCT No.: PCT/EP2018/075844
§ 371 (c)(1),
(2) Date: Apr. 3, 2020

(87) PCT Pub. No.: WO2019/068499
PCT Pub. Date: Apr. 11, 2019

(65) Prior Publication Data
US 2020/0294655 A1 Sep. 17, 2020

Related U.S. Application Data (60) Provisional application No. 62/568,438, filed on Oct. 5, 2017.

(51) Int. Cl.
G16H 30/40 (2018.01)
G16H 15/00 (2018.01)
G16H 30/20 (2018.01)

(52) U.S. Cl.
CPC .............. *G16H 30/40* (2018.01); *G16H 15/00* (2018.01); *G16H 30/20* (2018.01)

(58) Field of Classification Search
CPC ........ G16H 30/40; G16H 15/00; G16H 30/20; G16H 50/20; G16H 10/60; G16H 40/20
See application file for complete search history.

(56) References Cited

U.S. PATENT DOCUMENTS 8,463,621 B2 6/2013 Dejarnette
8,589,379 B2 11/2013 Hirasawa
(Continued)

FOREIGN PATENT DOCUMENTS

JP 2009066060 A 4/2009
JP 2015207080 11/2015
(Continued)

OTHER PUBLICATIONS

Batra, Anil. "Smoking: Disease or Lifestyle?." Deutsches Ärzteblatt International, vol. 106, No. 27, 2009, pp. 449-450., https://doi.org/10.3238/arztebl.2009.0449 (Year: 2009).*
(Continued)

Primary Examiner — Chad A Newton (57) ABSTRACT

A radiology workstation (14) used to interpret a radiology examination (48) includes a display (20, 22), a user input device (24, 26, 28), and an electronic processor (12, 16). A radiology image of the radiology examination is displayed on the display. A radiology report is entered. An imaged anatomical region (54) is determined from the stored radiology examination. An examination basis medical condition is identified from the reason for examination (52). At least one additional medical condition is determined based on information on the patient retrieved from one or more medical databases (10, 44, 46) and is classified as reviewable or not reviewable based on the imaging modality (50) and the imaged anatomical region. An attention list (40) is
(Continued)

created with items directed to the examination basis medical condition and to each reviewable additional medical condition. A representation (42) of the attention list is displayed on the display.

18 Claims, 5 Drawing Sheets

(56) References Cited

U.S. PATENT DOCUMENTS

| | | | |
|---|---|---|---|
| 9,081,877 B2 | 7/2015 | Futami | |
| 2002/0131625 A1 | 9/2002 | Vining | |
| 2007/0168461 A1* | 7/2007 | Moore | G16H 10/60 |
| | | | 709/217 |
| 2009/0006131 A1 | 1/2009 | Unger | |
| 2010/0268547 A1 | 10/2010 | Dejarnette | |
| 2012/0183191 A1 | 7/2012 | Nakamura | |
| 2012/0290319 A1* | 11/2012 | Saria | G16H 15/00 |
| | | | 705/3 |
| 2012/0300997 A1 | 11/2012 | Li | |
| 2014/0006926 A1* | 1/2014 | Yeluri | G16H 15/00 |
| | | | 715/234 |
| 2014/0219500 A1* | 8/2014 | Moehrle | G06T 7/0014 |
| | | | 382/103 |
| 2014/0257854 A1 | 9/2014 | Becker | |
| 2015/0081716 A1* | 3/2015 | Jagannathan | G16H 40/20 |
| | | | 707/740 |
| 2015/0339457 A1 | 11/2015 | Arazi | |
| 2017/0068795 A1* | 3/2017 | Liu | A61B 5/16 |
| 2018/0358121 A1* | 12/2018 | Carolus | G16H 30/40 |
| 2019/0122397 A1* | 4/2019 | Calhoun | A61B 5/08 |

FOREIGN PATENT DOCUMENTS

| | | |
|---|---|---|
| JP | 2016021248 A | 2/2016 |
| WO | 2016071791 | 5/2016 |
| WO | 2016/125039 | 8/2016 |
| WO | 2017/216055 | 12/2017 |

OTHER PUBLICATIONS

International Search Report and Written Opinion Dated Jan. 14, 2019 For International Application No. PCT/EP2018/075844 filed Sep. 25, 2018.

* cited by examiner

SYSTEM AND METHOD TO AUTOMATICALLY PREPARE AN ATTENTION LIST FOR IMPROVING RADIOLOGY WORKFLOW

CROSS REFERENCE TO RELATED APPLICATIONS

This application is the U.S. National Phase application under 35 U.S.C. § 371 of International Application No. PCT/EP2018/075844 filed Sep. 25, 2018, published as WO 2019/068499 on Apr. 11, 2019, which claims the benefit of U.S. Provisional Patent Application No. 62/568,438 filed Oct. 5, 2017. These applications are hereby incorporated by reference herein.

FIELD

The following relates generally to the radiology arts, radiology reading arts, radiology workstation arts, radiology workstation user interfacing arts, and related arts.

BACKGROUND

In existing radiology reporting, a radiology examination is ordered and performed, and subsequently the images are read by a radiologist who reports findings of the radiology examination followed by his/her impressions towards diagnosis in the form of a written radiology report. The referral order for the radiology examination states a reason for examination, textually and/or in the form of an order code such as an ICD code suitable for billing purposes, and the radiologist is tasked with addressing the reason for examination. The radiologist is a medical specialist in the field of radiology, and according to personal expertise may also incidentally identify other medical conditions or concerns to the extent the radiologist recognizes them in the radiology images. However, in practice the radiologist's opportunity to investigate medical conditions going beyond the scope of the reason for examination is curtailed by time constraints.

In a typical work environment, the images and metadata of radiology examinations are stored in a Picture Archiving and Communications System (PACS) and/or a Radiology Information System (RIS) or the like, and the radiologist is seated at a radiology workstation providing a graphical user interface (GUI) environment tailored for supporting the radiology examination reading process, e.g. providing windows for viewing images, a report entry window, and optionally other windows for displaying patient information or the like. In many clinical settings, a radiologist is expected to maintain high throughput. For example, a typical Radiology Department may expect the radiologist to perform a complete x-ray or ultrasound reading, including reviewing every image, making medical determinations, and dictating and filing the radiology report, in a time frame of about two minutes or even less. A more complex reading, such as a multi-slice computed tomography (CT) or magnetic resonance imaging (MRI) reading, may be expected to be performed in about 5-7 minutes. These are merely illustrative expected reading times and longer or shorter expected reading times may be instituted for a given Radiology Department. A given radiology reading task also may take longer (or shorter) than these expected times—but on average, the radiologist is expected to meet benchmark time frames such as the above typical values to be operating at an acceptable level of efficiency.

The following discloses certain improvements.

BRIEF SUMMARY

In accordance with one illustrative example, a radiology workstation is operative to support interpreting a stored radiology examination of a patient. The stored radiology examination is stored in a radiology database and comprises one or more radiology images and stored data including at least an imaging modality and a reason for examination. The radiology workstation comprises a display, a user input device, and an electronic processor programmed to perform a reading method. The reading method includes: displaying a radiology image of the radiology examination on the display; receiving a radiology report entered via the user input device; determining an imaged anatomical region from the stored radiology examination; identifying an examination basis medical condition from the reason for examination; determining at least one additional medical condition based on information on the patient retrieved from one or more medical databases; classifying each additional medical condition as reviewable or not reviewable based on the imaging modality and the imaged anatomical region; populating an attention list with items directed to the examination basis medical condition and to each reviewable additional medical condition; and displaying a representation of the attention list on the display.

In accordance with another illustrative example, a method of supporting interpretation of a stored radiology examination of a patient is disclosed. The stored radiology examination comprises one or more radiology images and stored data including at least an imaging modality and a reason for examination. The method comprises: displaying a radiology image of the radiology examination on a display; receiving a radiology report entered via a user input device; determining at least one medical condition based on information on the patient retrieved from one or more medical databases; classifying each medical condition as reviewable or not reviewable based on the imaging modality and an imaged anatomical region of the radiology examination; creating an attention list including at least one item directed to each reviewable medical condition; and displaying a representation of the attention list on the display.

In accordance with another illustrative example, a non-transitory storage medium stores instructions readable and executable by at least one electronic processor to perform a method of supporting interpretation of a stored radiology examination of a patient. The stored radiology examination comprises one or more radiology images and stored data including at least an imaging modality and a reason for examination. The method comprises: displaying a radiology image of the radiology examination on a radiology workstation; receiving a radiology report entered via the radiology workstation; determining at least one medical condition based on information on the patient retrieved from one or more medical databases; classifying each medical condition as reviewable or not reviewable based on the imaging modality and an imaged anatomical region of the radiology examination; creating an attention list including at least one item directed to each reviewable medical condition; and displaying a representation of the attention list on the radiology workstation.

One advantage resides in providing a radiology workstation configured to inform the radiologist of attention items including existing medical conditions of the patient that should be reviewed but that are not part of the stated reason for examination.

Another advantage resides in providing a radiology workstation configured to inform the radiologist of attention items including medical conditions for which the patient is particularly at risk (eg., due to age, sex, race, genetic background, family history, etc.) and could be advantageously screened, but that are not part of the stated reason for examination.

Another advantage resides in providing a radiology workstation configured to inform the radiologist of attention items including particular items to review relating to the stated reason for examination.

Another advantage resides in providing a radiology workstation configured to inform the radiologist of one or more of the foregoing attention items and to further provide links to evidence supporting inclusion of each attention item in the attention list.

Another advantage resides in providing a radiology workstation configured to inform the radiologist of one or more of the foregoing attention items in an unobtrusive manner.

Another advantage resides in providing a radiology workstation configured to inform the radiologist of one or more of the foregoing attention items and to enforce their consideration by holding up issuance of the radiology report until all items are addressed in the report.

Another advantage resides in providing a radiology workstation configured to inform the radiologist of one or more of the foregoing attention items and to enforce their consideration by holding up issuance of the radiology report until all items are addressed in the report or are removed from the attention list by affirmative action performed by the radiologist.

Further advantages of the present invention will be appreciated by those of ordinary skill in the art upon reading and understanding the following detailed description. It will be appreciated that a given embodiment may provide none, one, two, or more of these advantages.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Improvements disclosed herein are premised in part on the recognition herein that radiology images acquired for a stated reason for examination may nonetheless be useful for other tasks, such as reviewing existing problems ("existing" problems as used herein broadly include past problems that are currently in remission, believed to be cured, not currently manifesting symptoms or so forth, but which have a heightened likelihood of recurrence, e.g. certain types of cancer) of the patient which are not requested in the examination order, and/or screening for other medical conditions for which the patient may be at particularly high risk. However, the radiologist may not be aware of existing problems of the patient which are not identified in the examination order. Likewise, the radiologist may fail to proactively screen for at-risk medical conditions that can be screened using the imaging examination (that is, are detectable using the imaging modality, contrast, et cetera), either due to ignorance of the patient's heightened risk for the medical condition or due to time constraints. Furthermore, even if the radiologist investigates an existing condition or screens for an at-risk medical condition, unless an affirmative finding is identified the radiologist may fail to mention this in the radiology report. In this case, the referring physician cannot assume that the radiology examination addressed the existing medical condition, or screened for the at-risk medical condition. As a consequence, the patient may undergo additional, repetitive radiology examinations, leading to inefficiency and, in the case of certain imaging modalities, increased ionizing radiation dose. Furthermore, if the radiologist fails to make an affirmative finding of a medical condition of the patient, the patient may suffer due to delayed diagnosis and treatment.

In some improvements disclosed herein, an attention list graphical user interface (GUI) dialog (i.e. dashboard) is displayed on a display of the radiology workstation. This attention list GUI dialog identifies items the radiologist should address. An attention item as used herein may be any clinical condition, potential diagnosis, or other medical item that is recommended to be addressed by the radiologist in the radiology report. The attention items may, for example, include: "new" items pertaining to the stated reason for examination; "existing" items pertaining to existing medical condition(s) of the patient (for example, drawn from an Electronic Health Record or the like; an existing medical condition as used herein may broadly encompass a condition currently in remission and/or not currently symptomatic), and/or screening items calling for the radiologist to screen for at-risk medical condition(s) for which the patient is at heightened risk (as determined from demographic data, potential for co-occurrence of a new medical condition based on an existing medical condition, or so forth). The illustrative attention list GUI dialog optionally presents the attention items with links to evidence which would merit attention to (and addressing) each listed item. Optionally, issuance of the radiology report may be conditioned on every item of the attention list being addressed in the report (even if by a statement such as "<organ> is normal"). This approach ensures all attention items are addressed, and are presented in the report so that the referring physician can rely on the radiology examination for each of these items. In a variant approach, the radiologist may bypass one or more items by affirmatively removing them from the attention list, thereby providing more control for the radiologist while still ensuring the radiologist at least considers each item.

As used herein, a "patient" refers to a radiology examination subject (or "examination subject" for brevity). The term "patient" as used herein broadly encompasses hospital in-patients, hospital out-patients, emergency room patients, independent imaging center clients, persons who visit a medical office of any kind and are directed to a radiology laboratory for a radiology examination, or so forth. Terms such as "radiology", "radiology examination", and the like refer to medical imaging examination that acquires medical images of the subject. The radiology modality may, by way of non-limiting illustrative example, be magnetic resonance imaging (MRI), transmission computed tomography (CT) imaging, positron emission tomography (PET) imaging, single photon emission computed tomography (SPECT) imaging, fluoroscopy imaging, digital radiography (DR) imaging, ultrasound imaging, or so forth. A "radiology report" is a text-based report (optionally including some embedded images or other non-textual elements) describing the findings of a radiologist (which as used herein broadly encompasses any medical professional drafting a report providing expert findings determined from the images) who has reviewed (i.e. "read") the images of the radiology examination. A "medical condition" is used herein in its usual and ordinary sense as a broad term that encompasses diseases, lesions, disorders, or the like that are normally susceptible to receiving medical treatment.

Figure 1:
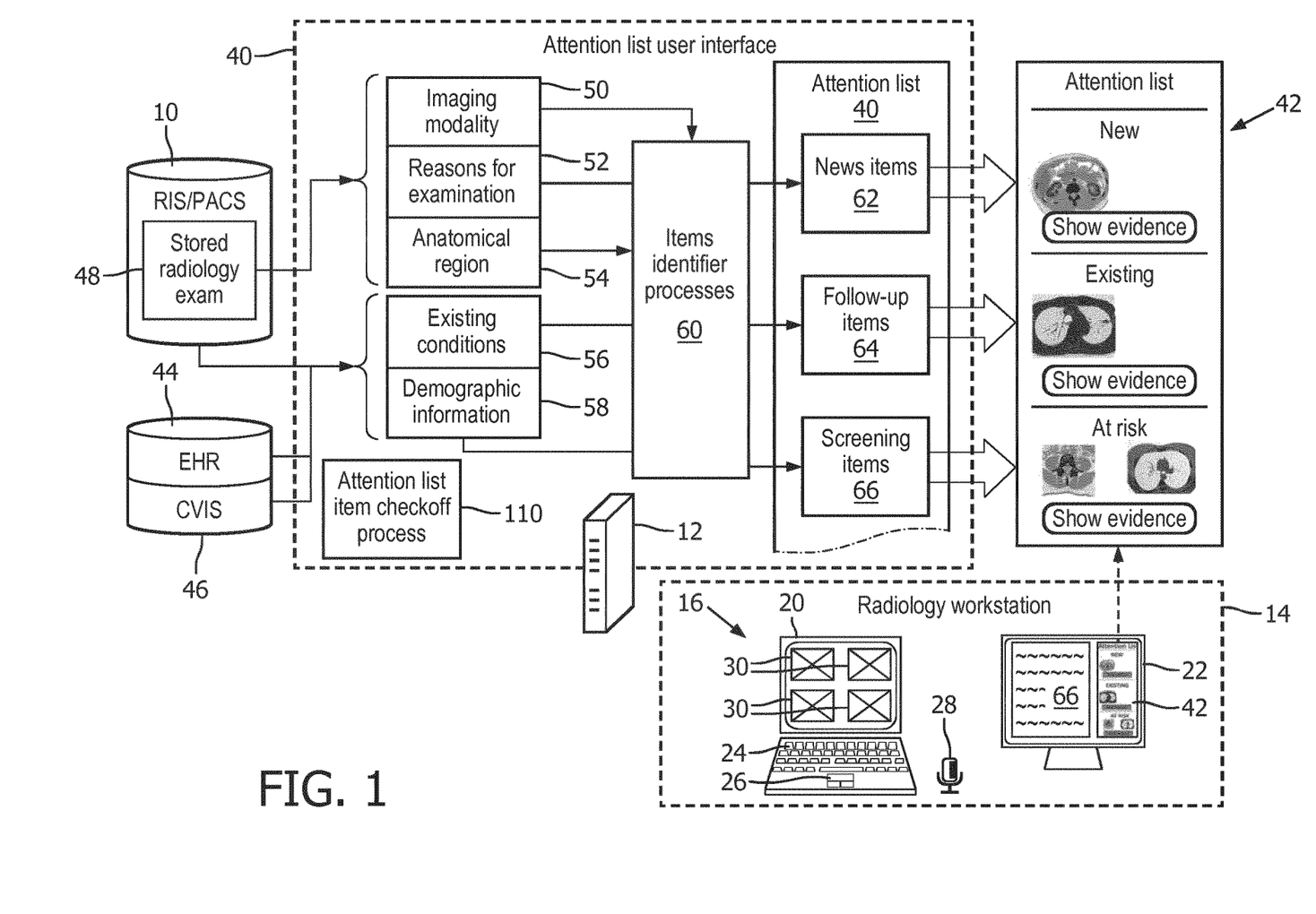
FIG. 1 diagrammatically illustrates a radiology workstation configured to inform the radiologist of attention items.

With reference to FIG. 1, a radiology database 10 such as a Picture Archiving and Communication System (PACS) and/or Radiology Information System (RIS) is implemented on a networked computing system 12 diagrammatically indicated in FIG. 1 by a server computer. It will be appreciated that the networked computing system 12 may comprise a single server computer, a computing cluster, a cloud computing resource, or so forth. The radiology database 10 is referred to herein as an RIS/PACS database 10 as these are commonly employed names for the radiology database; however, other phraseology may be employed. The networked computing system 12 is connected with one or (more typically) a plurality of radiology workstations, where FIG. 1 illustrates a single representative radiology workstation 14, via a secure electronic data network, such as a wired and/or wireless Wide Area Network (WAN) implemented via Ethernet, WiFi, the Internet, various combinations thereof, or another suitable wired and/or wireless electronic data networking protocol. The secure electronic data network should have sufficient bandwidth to communicate radiology images, which are typically large data files, to and from the radiology workstation 14. Optionally, the RIS/PACS 10 may be accessible from other computing systems such as physician's desktop computers, radiological imaging system controllers (e.g. MRI or CT system controllers) or so forth (not shown).

Each radiology workstation 14 includes a workstation electronic processor, for example embodied as a computer 16. The workstation electronic processor may be a multi-core processor, a cloud computing resource, various combinations thereof, or so forth. It is also contemplated to consider the server computer 12 or other operatively connected electronic processor as an electronic processor of the radiology workstation 14. Each radiology workstation 14 further includes at least one display device, e.g. an illustrative display device 20 of the computer 16 and an additional display device 22. It is contemplated that the radiology workstation 14 may employ a web browser-based user interface. Providing the radiology workstation 14 with two (or more) display devices can be advantageous as it allows one display device to be used to display textual content or other auxiliary information while the other display device is used as a dedicated radiology image viewer; however a radiology workstation with only a single display device is also contemplated. At least one display device of the radiology workstation 14 should be a high-resolution display capable of displaying radiology images with sufficiently high resolution to enable the radiologist to accurately interpret the radiology image. Each radiology workstation 14 further includes at least one user input device, such as: an illustrative computer keyboard 24; a mouse, touchpad 26, or other pointing device; a touch-sensitive display (e.g., one or both display devices 20, 22 may be a touch-screen display); a dictation microphone 28, or so forth. In the illustrative example, the display 20 presents one or more (illustrative four) images 30, while the display 22 presents a report window 32 which displays (a portion of) a radiology report being drafted by a radiologist using dictation via the dictation microphone 28. As is known in the art, the workstation preferably allows the radiologist to manipulate the displayed images using operations such as pan, zoom, various filtering operations (e.g. edge detect, contrast adjustments, et cetera), or so forth, and may also provide GUI tools for using one or more cursors to measure dimensions of image features (e.g. a tumor), and so forth. It may be noted that the term "radiology workstation" is used herein as it is commonly used in the relevant arts, but more generally the radiology workstation 14 as used herein encompasses any computer or electronic device with at least one display, at least one user input device, and an electronic processor programmed to provide for displaying images and for receiving input of a radiology report.

The radiology workstation 14 is employed by a radiologist in performing a reading of a radiology examination. Typically, the workstation 14 displays a list of imaging studies and the radiologist selects a study for review (i.e. reading) based on preference or based on assignment. The selected imaging study is opened, and the radiologist browses through images, may open some prior imaging studies (including images and/or reports) accessible through PACS and RIS 10, may also access patient data from the general-purpose medical database 44 or other patient database 46 such as sex, age, lab results, drug usage, blood test, or so forth. The radiologist may select an appropriate report template and then start dictating (through transcribing) clinical observations and impressions. The radiologist may also include in the report text regarding the relevant history of the patient, data available from prior reports and images that are relevant to current problem. The clinical observations and impressions may include diagnosis and follow up steps and recommendations and/or so forth. The radiologist may also mark some locations in the image data, which may be stored for example as metadata in the report, and make a reference to such markings in the report.

With continuing reference to FIG. 1, the electronic processor 12 is further programmed to implement an attention list user interface 36 configured to generate an attention list 40 that is displayed as an attention list dialog 42 on a display 22 of the radiology workstation 14. The attention list 40 is created with items directed to each of one or more reviewable medical conditions that are determined by the attention list user interface 36 based on information on the patient retrieved from one or more medical databases, such as an illustrative Electronic Health Record (EHR), Electronic Medical Record (EMR), or other general-purpose medical database 44 and/or an illustrative cardiovascular information system (CVIS) 46 and/or the aforementioned radiology database 10 and/or other domain-specific medical database, and/or so forth. The attention list may optionally also include one or more items directed to an examination basis medical condition (or conditions), that is, to the medical condition or conditions that prompted the referring physician to order the radiology examination.

As diagrammatically shown in FIG. 1, the attention list user interface 36 collects information for creating the attention list with items directed to medical conditions that are, or reasonably may be expected to be, relevant to the patient. To this end, the radiology examination 48 stored in the RIS/PACS 10 is mined for relevant information. The stored radiology examination 48 comprises one or more radiology images and stored data including at least the imaging modality 50 of the examination (e.g., MRI, CT, PET, SPECT, DR, fluoroscopy, ultrasound, or so forth) and a reason for examination 52. The image modality b may be stored in various ways, such as metadata making up a header or other informational file or section of the stored radiology examination, or modality metadata tags associated with the individual images, or so forth. The reason for examination 52 may be stored as part of the header or other informational file or section of the stored radiology examination 48, or as an entry of the referral order form, and/or so forth. The reason for examination 52 may be variously expressed, for example as a freeform textual phrase stating the reason as articulated by the referring physician, or as a standard reason selected from a drop-down list or other GUI dialog on the referral form, or as a billable order code such as an International Classification of Diseases (ICD) code commonly used for medical insurance billing in the United States, as a combination of one or more of the foregoing, or so forth.

To determine medical conditions for inclusion in the attention list 40, another useful piece of information is the imaged anatomical region 54, which may also be determined from the stored radiology examination 48. The imaged anatomical region 54 may be stored as part of the header or other informational file or section of the stored radiology examination 48, e.g. the header may indicate a "chest CT" or "brain MRI" or so forth. If there is no metadata indicating the imaged anatomical region then it is contemplated to determine the anatomical region 54 by analysis of the radiology images themselves, e.g. by segmenting one or two representative images to determine the imaged anatomy.

In addition to mining the stored radiology examination 48 for information 50, 52, 54, the various available medical databases 10, 44, 46 may be mined to identify medical conditions that may be susceptible to review during interpretation of the radiology examination 48. For example, the patient medical record in the EHR 44, CVIS 46, or so forth may be searched for keywords indicating existing medical conditions 56. If such database is more structured using some standard data structure paradigm, then this may be leveraged to perform more focused searching for medical conditions. Similarly, the medical database(s) 10, 44, 46 may be searched to determine one or more "at-risk" medical conditions for which the patient is at heightened risk based on retrieved information such as demographic information 58. For example, if the patient is a male over a certain age threshold then prostate cancer may be a determined at-risk medical condition; similarly, if the patient is a female over a certain age threshold then breast cancer may be a determined at-risk medical condition. At-risk medical conditions may also be determined as commonly co-occurring medical conditions that are statistically likely to co-occur with one of the existing medical conditions 56. For example, if the patient has a certain cancer as an existing medical condition 56, then an at-risk condition may be some other type of cancer that sometimes results from metastasis of the existing type of cancer.

With continuing reference to FIG. 1, the electronic processor 12 is further programmed to execute items identifier processes 60 that identifies items for inclusion in the attention list 40. The reason for examination 52 is generally most informative for including in the attention list 40 new items 62 directed to the examination basis medical condition. The existing conditions 56 are generally most informative for including in the attention list 40 follow-up items 64 directed to existing medical conditions. Demographic information 58 is generally most informative for including in the attention list 40 screening items 66 directed to at-risk conditions for which the patient is at heightened risk. Some screening items 66 may also be included in the attention list 40 on the basis of the existing medical conditions 56, e.g. a screening item may be directed to a medical condition that is statistically likely to co-occur with an existing medical condition the patient already has. The items identifier processes 60 also identify attention items on the basis of the imaging modality 50, since some imaging modalities are not probative for some medical conditions. Likewise, the items identifier processes 60 also identify attention items on the basis of the imaged anatomical region 54, since the medical condition can only be investigated by way of the radiology examination if it acquired images of an anatomical region in which the medical condition is present. (As one example, if the images do not capture the breast region then they cannot be used to investigate whether the patient has breast cancer).

The attention list dialog 42 is a representation of the attention list 40 that is shown on the display 22 of the radiology workstation 14. The attention list dialog 42 presents the radiologist with the items of the attention list 40. The illustrative attention list dialog 42 presents the items grouped by the new items 62, the follow-up items 64, and the screening items 66; however, other organizational paradigms are contemplated. Of course, a given instance of an attention list for a given patient may not include all three of these categories of items.

Figure 2:
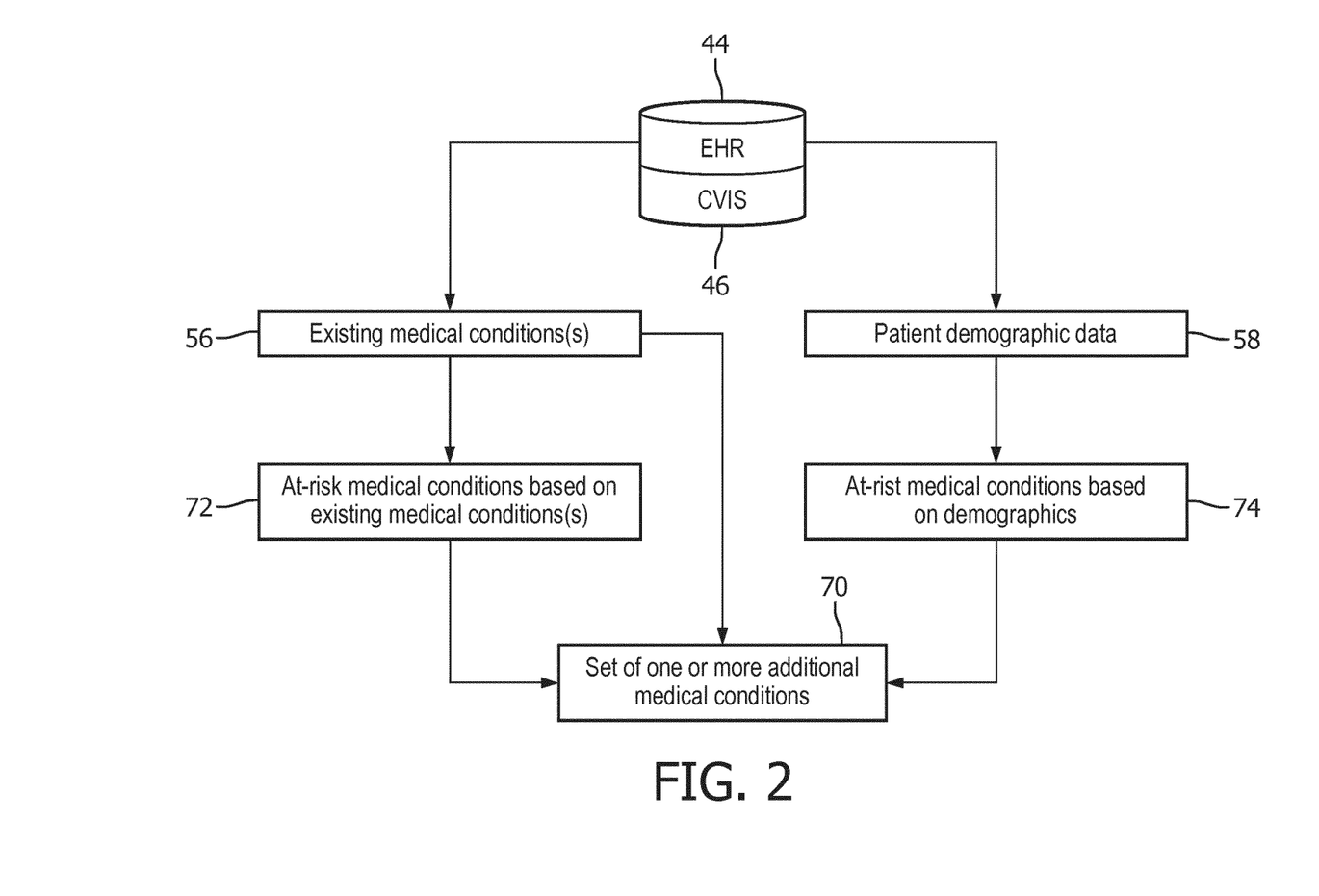
FIG. 2 diagrammatically illustrates operation of the items identifier processes to identify additional medical condition(s).

With reference to FIG. 2, an illustrative implementation of the items identifier processes 60 for identifying existing and at-risk medical conditions is diagrammatically shown. As already discussed, the existing medical condition(s) 56 and the demographic information 58 are mined from one or more medical databases 44, 46. For unstructured medical data this may be done by searching the electronic patient medical records for relevant keywords such as the names of medical conditions and/or terms such as "Reason for visit", "Diagnosis", "Age", "Gender", "Ethnicity", and so forth. For structured medical data, the underlying data structure may be leveraged in the retrieval of the salient information 56, 58. The goal of the processing diagrammatically shown in FIG. 2 is to identify one or more additional medical condition(s) 70 (where "additional" indicates conditions in addition to the stated reason for examination 52). To this end, any identified existing medical conditions 56 may be directly identified as additional medical conditions to consider (optionally after filtering out any of these that correspond to the reason for examination). Additionally, the existing medical condition(s) 56 may be compared against a look-up table or other data structure identifying statistically commonly co-existing medical conditions, that is, associating a given medical condition with one or more other medical conditions that commonly co-occur with the given medical condition. This analysis may generate one or more at-risk medical condition(s) 72 based on co-occurrence to be added to the list of additional medical condition(s) 70. Similarly, the demographic information 58 may be compared against a look-up table or other data structure identifying at-risk medical conditions for which a person in the demographic class is at heightened risk. For example, a male patient over the age of 50 may be at heightened risk for prostate cancer, while a female patient over the age of 50 may be at heightened risk for breast cancer. This analysis may generate one or more at-risk medical condition(s) 74 on the basis of demographics to be added to the list of additional medical condition(s) 70.

Figure 3:
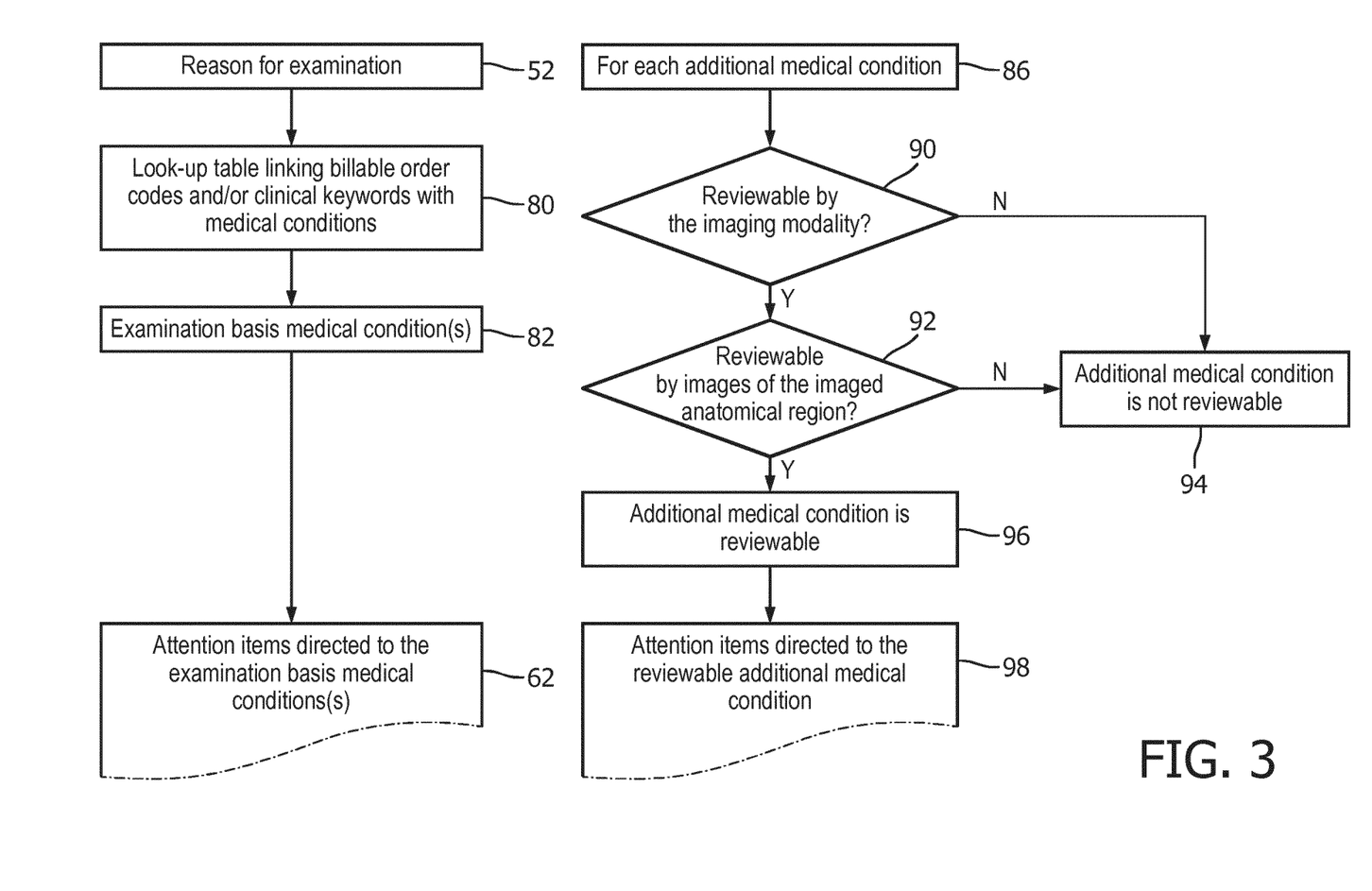
FIG. 3 diagrammatically illustrates operation of the items identifier processes to determine attention items from the reason for examination and the additional medical conditions.

With reference to FIG. 3, an illustrative implementation of the items identifier processes 60 for selecting attention items directed to the examination basis medical condition(s) determined from the reason for examination 52 and any additional medical conditions 70 (see FIG. 2) is described. To generate attention items directed to the examination basis medical condition(s) 62 (that is, the new items 62 of FIG. 1), the reason for examination 52 is analyzed to identify one or more examination basis medical conditions. This is done using a look-up table 80, whose content depends on the format of the reason for examination 52. For example, if the reason for examination 52 is given as a billable order code (e.g. an ICD code) then the look-up table 80 may suitably link billable order codes with medical conditions. If the reason for examination 52 is given as a textual phrase or statement of the reason for examination, then the look-up table 80 may suitably link clinical keywords with medical conditions. The content of the reason for examination 52 such as the ICD code(s) and/or clinical keywords extracted from its text is input to the look-up table 80 to identify one or more examination basis medical condition(s) 82. One or more attention items 62 directed to the examination basis medical condition(s) 82 are then added to the attention list 40.

For each additional medical condition 86 (which is one of the additional medical conditions 70 identified by the processing of FIG. 2), it is determined in a decision block 90 whether the additional medical condition 82 is reviewable using the imaging modality 50 of the radiology examination, and if so it is further determined in a decision block 92 whether the additional medical condition 82 is reviewable by images of the imaged anatomical region 54 of the radiology examination. (The order of these tests 90, 92 may be swapped). If either the "reviewable via modality" test 90 or the "reviewable via imaged anatomical region" test 92 is not passed, then the additional medical condition 86 is determined at 94 to be not reviewable by the radiology examination, and the additional medical condition 86 accordingly does not serve as the basis for any attention item(s) being included in the attention list 40. On the other hand, if the additional medical condition 82 passes both tests 90, 92, then it is determined at 96 to be reviewable by the radiology examination, and one or more attention items 98 directed to the additional medical condition 86 are included in the attention list 40.

The attention items 62, 98 may be determined using a look-up table listing one or more attention items for each examination basis medical condition 82 and for each reviewable medical condition 96. The look-up table may be organized by modality, as the attention items for a given medical condition may be different for different imaging modalities. As an example, although a malignant tumor may be reviewable using either the CT imaging modality or the PET imaging modality, in the case of CT the attention item may include measuring physical dimensions of the tumor whereas in the case of PET the attention item may include measuring a standardized uptake value (SUV) for the tumor. Similarly, in some instances the look-up table may be organized by imaged anatomical region to the extent that the attention items for a given medical condition may depend upon the imaged anatomical region. For example, a follow-up item for an existing cancer may include measuring the malignant tumor if the imaged anatomical region includes the organ containing the tumor; whereas, if the imaged anatomical region does not include the tumor then the follow-up item may include searching for evidence of metastatic expansion of the cancer into the imaged anatomical region.

Figure 4:
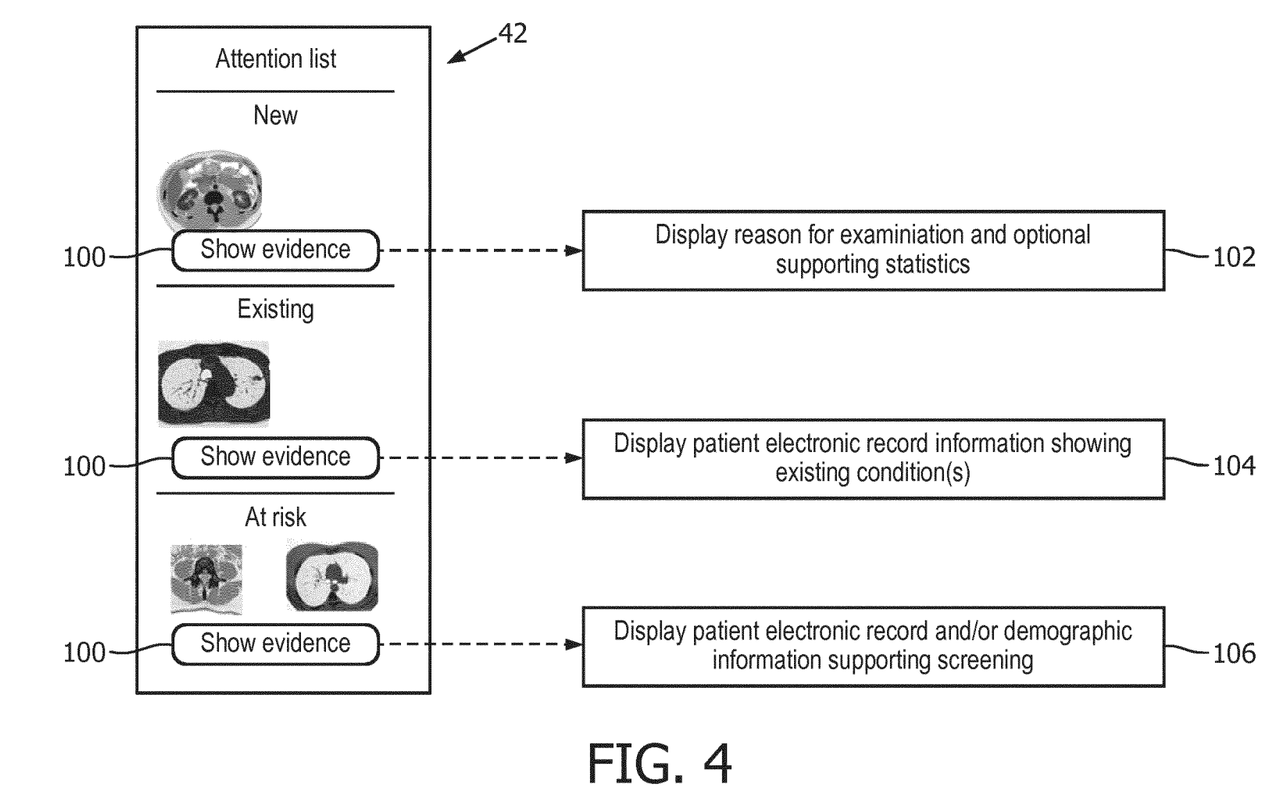
FIG. 4 diagrammatically illustrates a graphical user interface (GUI) dialog suitably shown by the radiology workstation of FIG. 1, further diagrammatically showing operation of links to evidence supporting inclusion of each attention item in the attention list.

With reference to FIG. 4, the illustrative embodiment of the attention list dialog 42 that is displayed on the radiology workstation 14 is shown. The illustrative attention list dialog 42 includes "show evidence" buttons 100. More generally, an evidence input 100 is optionally provided for each item of the attention list 40 which is directed to a reviewable additional medical condition, and optionally also for each item directed to an examination basis medical condition. In response to activation of the evidence input 100 for an item of the attention list 40 which is directed to an examination basis medical condition, the workstation 14 displays information 102 including the reason for examination 52 and optionally also supporting statistics or other supporting information justifying the action item in view of the reason for examination. For example, if the underlying examination basis medical condition is a certain type of cancer and the related attention item is to check for metastasis in the lungs, then the supporting statistics may cite to a recent medical paper demonstrating such metastasis is a common consequence of this type of cancer.

In response to activation of the evidence input 100 for an item of the attention list 40 which is directed to a reviewable additional medical condition, the information 104 retrieved from the one or more medical databases 44, 46 from which the reviewable additional medical condition was determined may be displayed. For example, the medical report making the initial diagnosis of the additional medical condition may be linked. Similarly, in response to activation of the evidence input 100 for an item of the attention list 40 which is directed to a reviewable at-risk medical condition, the information 106 retrieved from the one or more medical databases 44, 46 from which the reviewable at-risk medical condition was determined may be displayed. For example, the relevant patient demographic information may be displayed, or the existing medical condition for which the at-risk medical condition is a common co-occurrence may be identified. There are merely illustrative examples, and more generally the evidence inputs 100 may display or link to any type of information, document, representative image, or the like that may be of informational value to the radiologist in assessing whether and/or in what way the attention item should be addressed.

Figure 5:
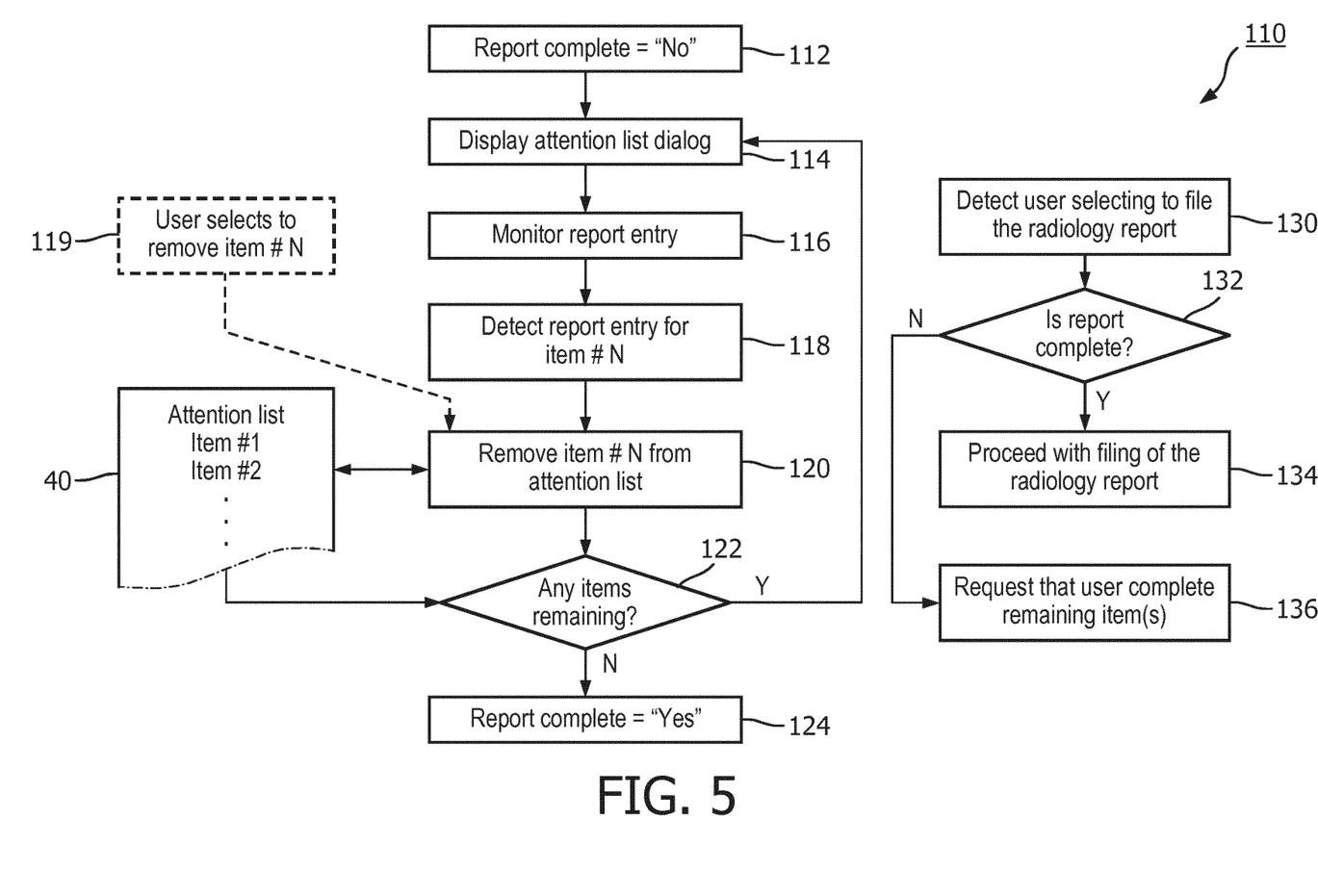
FIG. 5 diagrammatically illustrates operation of the attention list item checkoff process suitably implemented by the radiology workstation of FIG. 1.

With reference back to FIG. 1 and with further reference to FIG. 5, in some embodiments the attention list user interface operates dynamically to remove items from the attention list 40 (and from the corresponding attention list dialog 42) as the items are addressed by the radiologist. A suitable illustrative attention list item checkoff process 110 is illustrated in FIG. 5. The process starts in an operation 112 by setting a "report complete" parameter to "no" or some equivalent value indicating that there are still items remaining on the attention list 40. In an operation 114 the attention list dialog 42 is displayed. In an operation 116, the entry of the radiology report (via window 32 shown in FIG. 1) is monitored for indications that an item of the attention list 40 has been addressed. In an operation 118, a report entry is detected which constitutes a finding associated with an item (designated item #N without loss of generality) of the attention list. This detection 118 may be done, for example, by detecting entry of a keyword associated with the attention item, or in the case of a (semi-) structured radiology report detection of entry of a field associated with the attention item, or so forth. In a variant embodiment, the radiologist may affirmatively indicate via a selection 119 that an attention item #N should be removed. In response to the detection 118 or user selection 119, in an operation 120 the attention item #N is removed from the attention list 40. At a decision point 122, if the attention list is now empty then in an operation 124 the "report complete" parameter is set to "yes" or some equivalent value indicating that there are no remaining items on the attention list 40. If the decision point 122 determines that items remain on the attention list 40, then flow returns to display operation 114 to update the attention list dialog 42 to reflect removal of item #N, and the processing continues. This processing ensures that the attention list 40 is updated to reflect completion of attention items, thereby enabling the radiologist to particularly focus on those items that remain to be completed.

In some embodiments, the attention list item checkoff process 110 enforces completion of all items of the attention list 40 by the following illustrative operations. In an operation 130 the radiology workstation 14 detects that the radiologist is selecting to file the radiology report. This can be done, for example, by detecting selection of a "Save" button activated to save the radiology report or by any other suitable approach operative in the context of the mechanism by which the radiology workstation 14 files a completed radiology report. In response to the detection 130, at a decision 132 it is determined whether the report is complete, i.e. whether all attention items of the (original) attention list 40 have been addressed. This can be done in the illustrative embodiment by testing the "report complete" parameter, or in another embodiment by counting the number of items on the attention list 40. In an operation 134, if the report is complete (i.e. no remaining attention items) then the radiology report is filed in the usual way implemented by the radiology workstation 14. On the other hand, if the decision 132 finds that there are remaining attention items that have not yet been addressed, then in an operation 136 the radiologist is requested to address those remaining attention items.

If the option 119 to manually remove attention items is omitted, then the processing 130, 132, 134, 136 enforces that the radiology report must address every attention item. This maximally ensures comprehensiveness of the completed radiology report, but at the possible risk of forcing the radiologist to include entries in the report that he or she may deem inappropriate. On the other hand, if the option 119 is provided then the radiologist has the ability to omit such items from the report thereby providing more flexibility to the radiologist at the possible cost of a less comprehensive completed radiology report.

It will be appreciated that the illustrative computational components such as the attention list user interface 40 may be embodied as a non-transitory storage medium storing instructions executable by an electronic processor (e.g. the radiology workstation 14 which may be partially embodied as server computer 12 or other computing hardware) to perform the disclosed operations. The non-transitory storage medium may, for example, comprise a hard disk drive, RAID, or other magnetic storage medium; a solid state drive, flash drive, electronically erasable read-only memory (EEROM) or other electronic memory; an optical disk or other optical storage; various combinations thereof; or so forth.

Some further/variant embodiments are described in the following.

In another illustrative embodiment, the attention list user interface includes: (1) a module to automatically identify an accurate coordinate or region-of-interest findings related to reason for examination, e.g. using a computer-aided detection (CADe) system; (2) a module to automatically review patient clinical context and identify existing problems and follow-ups; (3) a module to automatically determine organs at risk; (4) a module to determine whether the current imaging study (i.e. radiology examination) is appropriate for reviewing (2) and (3) based on modality and field of view (FOV, i.e. the imaged anatomical region); (5) a graphical user interface to present results of module (4) as well as access to related material; and (6) an agent that tracks whether the reader (e.g. radiologist performing the radiology reporting) has observed all suggested areas of interest. These various modules and agent may be implemented, for example, as a non-transitory storage medium storing instructions readable and executable by an electronic processor 12, 14. Illustrative examples of modules/agents (1)-(6) are described in further detail in the following.

Module (1) is a module to automatically identify an accurate coordinate or region-of-interest findings related to reason for exam (CADe). This module can potentially contain automatic finding detection tools such as lung nodule detection. Given the reason for examination and the modality, automatic image processing/machine learning algorithms can be utilized to automatically identify either exact coordinates or a rough region-of-interest to bring to radiologist's attention. If image processing/machine learning algorithms are not available for automatic detection, population statistic-based knowledge can be leveraged, e.g., which area of liver is the most common site for tumors given current patient demographics and based on data from similar patients within the population.

Module (2) is a module to automatically review patient clinical context and identify existing problems and follow ups. This module identifies existing problems (i.e. medical conditions) of the patient that could potentially be followed up. This module may comprise sub-modules for crawling through patient clinical history and context (EMR, lab results, previous radiology reports, previous pathology reports, etc.) and detect and extract relevant information (such as mention of findings with follow up recommendation). Such sub-modules may employ indexed based search engines, natural language processing (NLP), concept extraction based on ontologies, etc.

Module (3) is a module to automatically determine organs at risk. This module automatically determines which other organs of the patients besides the organ(s) related to reason for examination and organ(s) related to existing problem(s) could potentially be at risk of developing an abnormality given patient's ongoing problems as well as risk of developing new abnormalities given patient demographics and information available from similar patients. For example, if the patient is known to have advanced prostate cancer, there is a high likelihood that the cancer might have metastases to adjacent organs such as bladder or pelvis. Also, given patient's age, sex, family history, etc. there is a high likelihood that the patient is at risk of developing lung cancer.

Module (4) is a module to determine whether current imaging study is appropriate for reviewing (2) and (3) based on modality and FOV. This module determines whether the current imaging modality (CT, MRI, etc.) and FOV (i.e. imaged anatomical region, e.g. chest, abdomen, etc.) is appropriate for reviewing targets identified by modules (1), (2) and (3). Appropriateness for an imaging modality pertains to whether the organ of interest is "visible" in terms of resolution, contrast and/or function. Appropriateness for FOV pertains to whether the current image's FOV captures the whole (or sufficient) extent of the anatomy of interest.

Module (5) is a graphical user interface to present results of module (4) as well as access to related material. The graphical user interface provides a medium for the end user (e.g. radiologist) to review and access the outcome of module (4) as well as the evidence behind the decision made through steps (1)-(4). Such a GUI is preferably seamlessly integrated into the radiologist's workflow without any interruption or distraction. The attention list can be made "clickable" so that the radiologist can quickly navigate from one suggested region of interest to the next. In one embodiment, only the regions of interest are highlighted that are visible on opened sequences. If the user clicks a region of interest in a sequence that is not open, it may open as a pop-up, rather than jumping to the corresponding slice.

Module (6) is an agent that checks if the reader has read all areas of interest. The graphical user interface (GUI) can further be augmented with interactive logic that allows the user to indicate "seen" or "not relevant" to indicate whether an item has been addressed. If any attention item has not been addressed at the end of the reading, i.e. when the radiologist acts to file the radiology report, this can be brought to the radiologist's attention, and may optionally also block finalization and filing of the radiology report. The agent (6) may perform tracking automatically through scrolling behavior or eyeball-tracking technology, if a certain region of interest is interrogated. A certain time threshold can be implemented to mark a region as "seen".

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A radiology workstation operative to support interpreting a stored radiology examination of a patient wherein the stored radiology examination is stored in a radiology database and comprises one or more radiology images and stored data including at least a first imaging modality used to acquire the one or more radiology images and a reason for examination including a reason for acquiring the one or more radiology images in an examination order, the radiology workstation comprising:
   a display;
   a user input device; and
   an electronic processor programmed to perform a reading method including:
      displaying a radiology image of the stored radiology examination on the display;
      receiving a radiology report entered via the user input device;
      determining an imaged anatomical region from the stored radiology examination;
      identifying an examination basis medical condition from the reason for examination;
      determining a plurality of additional medical conditions, different from the examination basis medical condition, based on information on the patient retrieved from one or more medical databases by obtaining a data structure that associates medical conditions to statistically common co-existing medical conditions, identifying a medical condition in the data structure that commonly co-occurs with the examination basis medical condition, and identifying the identified medical condition as the at least one additional medical condition different from the examination basis medical condition, wherein the plurality of additional medical conditions are not requested in the examination order, and wherein the patient is not diagnosed with the plurality of additional medical conditions prior to the identification from the data structure, and further wherein each of the plurality of additional medical conditions are reviewable using some imaging modality;
      classifying each of the plurality of additional medical conditions as: (1) reviewable if: (a) the additional medical condition is reviewable using the first imaging modality and (b) the additional medical condition is reviewable in the imaged anatomical region; or (2) not reviewable if: (a) the additional medical condition is not reviewable using the first imaging modality or (b) the additional medical condition is not reviewable in the imaged anatomical region, wherein at least one additional medical condition is classified as reviewable and at least one additional medical condition as classified as not reviewable;
      creating an attention list including items directed to the examination basis medical condition and to each additional medical condition classified as renewable, and omitting the additional medical condition classified as not reviewable;
      displaying a representation of the attention list on the display;
      monitoring the receipt of the radiology report to detect receipt of findings associated with items of the attention list;
      in response to each detection of receipt of a finding associated with an item of the attention list, removing the item from the attention list; and
      updating the representation of the attention list on the display.

2. The radiology workstation of claim 1, wherein the reading method further includes:
   detecting a selection via the user input device to file the radiology report and in response (i) filing the radiology report if all items of the attention list have been removed or (ii) displaying a request for attention to the item or items of the attention list that have not been removed.

3. The radiology workstation of claim 1 wherein the reading method further includes:
   receiving a selection via the user input device of an item deletion selection and in response deleting the corresponding item from the attention list.

4. The radiology workstation of claim 1 wherein determining at least one additional medical condition includes:
   determining at least one additional medical condition which is an existing medical condition of the patient based on the information on the patient retrieved from one or more medical databases.

5. The radiology workstation of claim 1 wherein determining at least one additional medical condition includes:
   determining at least one additional medical condition which is an at-risk medical condition for which the patient is at heightened risk based on the information on the patient retrieved from one or more medical databases.

6. The radiology workstation of claim 1 wherein the displaying of the representation of the attention list includes displaying an evidence input for at least each item of the attention list which is directed to a reviewable additional medical condition, wherein each evidence input includes a control button that activates a link to evidence that addresses a corresponding item of the attention list, and the reading method further includes:

in response to activation of the evidence input for an item of the attention list which is directed to a reviewable additional medical condition, displaying the information retrieved from the one or more medical databases from which the reviewable additional medical condition was determined, wherein activation of the evidence input invokes the displaying of the information.

7. The radiology workstation of claim 1 wherein the stored data of the stored radiology examination further includes an identification of the imaged anatomical region and the determining of the imaged anatomical region comprises reading the identification of the imaged anatomical region from the stored radiology examination.

8. The radiology workstation of claim 1 wherein at least one of:

the reason for examination is stored as a billable order code and the identifying of the examination basis medical condition comprises reading a look up table linking billable order codes with examination basis medical conditions; and the reason for examination is stored as text and the identifying of the examination basis medical condition comprises reading a look up table linking clinical keywords with examination basis medical conditions.

9. The radiology workstation of claim 1, wherein the identifying includes:

identifying a billing order code for the examination wherein the billing order code is indicative of the reason for the examination, obtaining a look-up table that maps billing order codes to the medical conditions, and identifying a medical condition in the look-up table corresponding to the identified billing order code, wherein the examination basis medical condition is the identified medical condition, or identifying a textual phrase or statement of the reason for examination, obtaining a lookup table that maps textual phrases or statements of reasons for examinations to the medical conditions, and identifying a medical condition in the look-up table corresponding to the identified textual phrase or statement, wherein the examination basis medical condition is the identified medical condition.

10. The radiology workstation of claim 1, further comprising: attention list user interface, including;

a first module configured to automatically identify an accurate coordinate or region-of-interest findings related to the reason for the examination;

a second module configured to automatically review patient clinical context and identify existing problems and follow-ups;

a third module configured to automatically determine organs at risk; and a fourth module configured to determine results indicating whether the radiology examination is appropriate for reviewing the identified existing problems and follow-ups and the determined organs at risk based on the first imaging modality and a field of view of the first imaging modality;

a graphical user interface configured to present the results and related material; and an agent that tracks whether a radiologist performing radiology reporting observed suggested areas of interest.

11. A method, using a radiology workstation, of supporting interpretation of a stored radiology examination of a patient wherein the stored radiology examination comprises one or more radiology images and stored data including at least a first imaging modality and a reason for examination in an examination order, the method comprising:

displaying a radiology image of the radiology examination on a display of the radiology workstation;

receiving a radiology report entered via a user input device of the radiology workstation;

determining, with an electronic processor of the radiology workstation, an imaged anatomical region from the stored radiology examination;

identifying, with the electronic processor, an examination basis medical condition from the reason for examination;

determining, with the electronic processor, at least one additional medical condition, different from the examination basis medical condition based on information on the patient retrieved from one or more medical databases by determining a demographic from the one or more medical databases, obtaining a data structure that associates medical conditions to risk levels for demographics, identifying a medical condition in the data structure for which a person in the demographic is at heightened risk, and identifying the identified medical condition corresponding to the heightened risk for the demographic as the at least one additional medical condition different from the examination basis medical condition, wherein the at least one additional medical condition is in addition to the examination basis medical condition from the reason for examination, and wherein the patient is not diagnosed with the at least one additional medical condition prior to the identification from the data structure, and further wherein the at least one additional medical condition is reviewable using some imaging modality;

classifying, with the electronic processor, each additional medical condition as: (1) reviewable if: (a) the additional medical condition is reviewable using the first imaging modality and (b) the additional medical condition is reviewable in an imaged anatomical region of the radiology examination; or (2) not reviewable if: (a) the additional medical condition is not reviewable using the first imaging modality or (b) the additional medical condition is not reviewable in the imaged anatomical region;

creating, with the electronic processor, an attention list including items directed to each additional medical condition classified as renewable, omitting any additional medical condition that is classified as not reviewable;

displaying a representation of the attention list on the display;

monitoring the receipt of the radiology report to detect receipt of findings associated with items of the attention list;

in response to each detection of receipt of a finding associated with an item of the attention list, removing the item from the attention list; and updating the representation of the attention list on the display.

12. The method of claim 11 further comprising:
detecting a selection via the user input device to file the radiology report and in response (i) filing the radiology report if all items of the attention list have been removed or (ii) displaying a request for attention to the item or items of the attention list that have not been removed.

13. The method of claim 11 further comprising:
receiving a selection via the user input device of an item deletion selection and in response deleting the corresponding item from the attention list.

14. The method of claim 11 wherein determining at least one medical condition includes:
determining at least one medical condition which is an existing medical condition of the patient based on the information on the patient retrieved from one or more medical databases.

15. The method of claim 11 wherein determining at least one medical condition includes:
determining at least one medical condition which is an at-risk medical condition for which the patient is at heightened risk based on the information on the patient retrieved from one or more medical databases.

16. The method of claim 11 further comprising:
displaying an evidence input for each item of the attention list; and
in response to activation of the evidence input for an item of the attention list, displaying the information retrieved from the one or more medical databases from which the reviewable medical condition was determined.

17. The method of claim 11 wherein creating the attention list includes:
creating the attention list with at least one item directed to the reason for examination.

18. A radiology workstation comprising a display, a user input device, an electronic processor, and a non-transitory storage medium storing instructions readable and executable by the electronic processor to perform a method of supporting interpretation of a stored radiology examination of a patient wherein the stored radiology examination comprises one or more radiology images and stored data including at least a first imaging modality and a reason for examination in an examination order, the method comprising:
displaying a radiology image of the radiology examination on the display of the radiology workstation;
receiving a radiology report entered via the user input device of the radiology workstation;
determining an imaged anatomical region from the stored radiology examination;
identifying an examination basis medical condition from the reason for examination;
determining at least one additional medical condition, different from the examination basis medical condition, based on information on the patient retrieved from one or more medical databases by searching unstructured medical data stored in the one or more medical databases using keywords, searching structured medical data stored in the one or more medical databases based on a structure of the structured medical data or searching both the unstructured medical data and the structured medical data to determine a set of existing conditions, filtering any existing condition from the set of existing conditions that corresponds to the reason for examination, and identifying the set of existing conditions after the removal of the any existing condition as the at least one additional medical condition different from the examination basis medical condition, and wherein the patient is not diagnosed with the at least one additional medical condition prior to the identification from the data structure, and further wherein the at least one additional medical condition is reviewable using some imaging modality;
classifying each additional medical condition as: (1) reviewable if: (a) the additional medical condition is reviewable using the first imaging modality and (b) the additional medical condition is reviewable in an imaged anatomical region of the radiology examination; or (2) not reviewable if: (a) the additional medical condition is not reviewable using the first imaging modality or (b) the additional medical condition is not reviewable in the imaged anatomical region;
creating an attention list including items directed to each additional medical condition classified as renewable, omitting any additional medical condition that is classified as not reviewable;
displaying a representation of the attention list on the radiology workstation;
monitoring the receipt of the radiology report to detect receipt of findings associated with items of the attention list;
in response to each detection of receipt of a finding associated with an item of the attention list, removing the item from the attention list; and
updating the representation of the attention list on the display.

* * * * *